United States Patent [19]

Olschewski et al.

[11] 4,367,904
[45] Jan. 11, 1983

[54] ROTARY DRILL BIT WITH CONICAL ROTARY CUTTERS

[75] Inventors: Armin Olschewski, Schweinfurt; Manfred Brandenstein, Eusenheim; Lothar Walter, Schweinfurt, all of Fed. Rep. of Germany

[73] Assignee: SKF Kugallagerfabriken GmbH, Schweinfurt, Fed. Rep. of Germany

[21] Appl. No.: 240,993

[22] Filed: Mar. 5, 1981

[30] Foreign Application Priority Data

Mar. 15, 1980 [DE] Fed. Rep. of Germany ... 8007104[U]

[51] Int. Cl.³ .................. E21B 10/20; F16C 19/00
[52] U.S. Cl. .................. 384/95; 175/370; 175/372
[58] Field of Search ............ 308/8.2, 207 R, 226–228; 175/359, 371, 372, 370

[56] References Cited

U.S. PATENT DOCUMENTS

| | | | |
|---|---|---|---|
| 1,905,079 | 4/1933 | Wellensiek et al. | 308/8.2 |
| 2,194,675 | 3/1940 | Sanders et al. | 308/8.2 |
| 2,292,036 | 8/1942 | Behnke | 308/8.2 |
| 2,293,603 | 8/1942 | Francis | 308/8.2 |
| 3,480,341 | 11/1969 | Hickernell | 308/8.2 |
| 4,258,806 | 3/1981 | Kunkel et al. | 175/372 X |

FOREIGN PATENT DOCUMENTS

| | | | |
|---|---|---|---|
| 456570 | 6/1936 | United Kingdom | 175/372 |
| 184202 | 9/1966 | U.S.S.R. | 175/359 |

*Primary Examiner*—Robert S. Ward, Jr.
*Attorney, Agent, or Firm*—Eugene E. Renz, Jr.

[57] ABSTRACT

In a rotary drill bit assembly, comprising a drill bit body, at least one trunnion and a rotary cutter rotatably supported on the rotary cutter by bearing means including at least one inner roller bearing, the rollers of the inner roller bearings running in a deep radial bearing race groove in the trunnion and a deep radial bearing race groove formed in the bore of the rotary cutter and a filling opening extending generally axially in the trunnion between the inner bearing race grooves, characterized in that the outer bearing facing the drill bit body comprises a tapered roller bearing including a plurality of tapered rollers and wherein the filling opening for the rolling elements of the inner bearing is arranged radially inside the inner bearing race of the tapered rollers in the trunnion.

8 Claims, 1 Drawing Figure

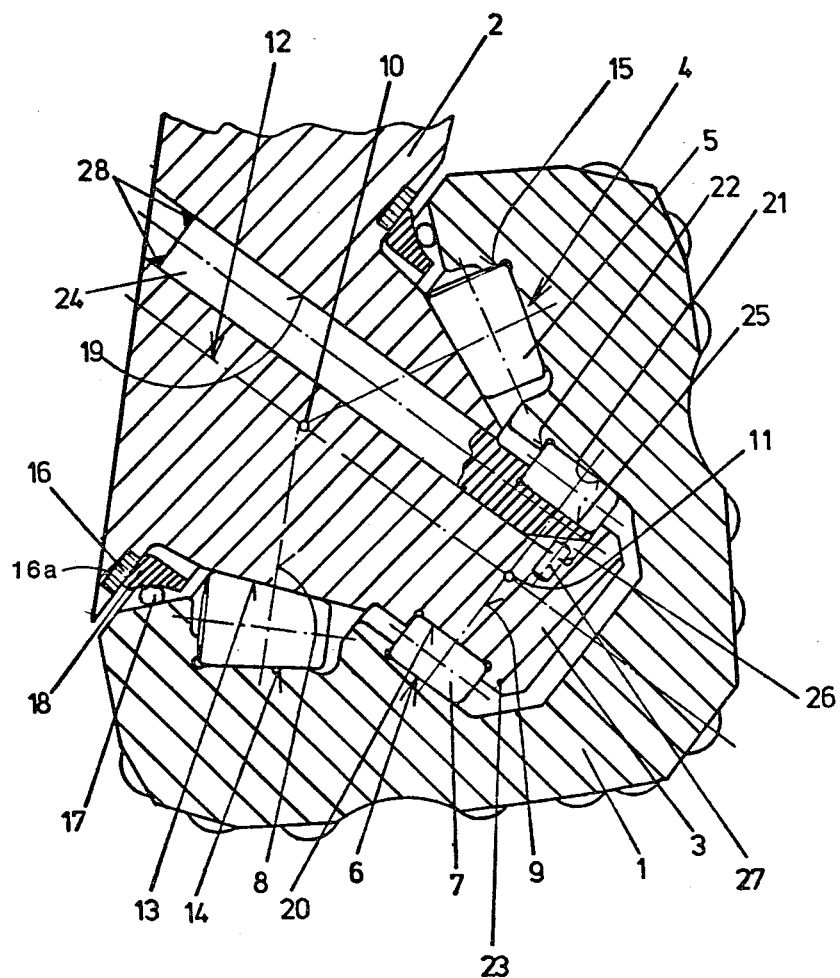

ROTARY DRILL BIT WITH CONICAL ROTARY CUTTERS

BACKGROUND AND SUMMARY OF THE INVENTION

The present invention relates to rotary drill bits having a plurality of conically shaped rotary cutters wherein each of the rotary cutters is supported in an outer roller bearing facing the drill bit body and at least one inner roller bearing on a trunnion projecting from the drill bit body. Rollers of the inner roller bearing run in a radial deep bearing race groove formed in the trunnion and in a deep bearing race groove formed in the bore of the rotary cutter for example, by machining. The rollers are inserted through a generally axially extending filling hole or elongated port in the trunnion between the two bearing race grooves.

Rotary drill bits of the type to which the present invention relate are not new per se. For example, rotary drill bits have been proposed in the past wherein the outer roller bearing facing the drill bit body comprises a cylindrical roller bearing wherein the cylindrical rollers are inserted through the filling hole of the inner roller bearing; that is, together with the rolling elements of the inner roller bearing. This type of assembly is shown in German Published Application No. 2,841,971. This type of rotary cutter has several disadvantages and drawbacks. For example, the rotary drill bit requires an inner bearing having the capability of withstanding extremely high axial forces by reason of the fact that extremely high axial forces of the conical rotary cutter occur in many applications and these forces are quite difficult to accommodate as a result of the inwardly tapering diameter of the rotary cutter. Furthermore, it has been observed that in inner roller bearing which takes the high axial forces developes increased bearing friction heat and consequently runs at a relatively high temperature since the heat generated near the tip of the rotary cutter during operation produced by cutter bore and bearing friction cannot always dissipate quickly enough to the ambient environment or to the drill bit body.

Furthermore, in these prior rotary drill bits, the rolling elements of the inner bearing which take up axial load are difficult to insert between the rotary cutter and trunnion when it is desired to insert the maximum number of rolling elements without a cage at the periphery of the trunnion in order to obtain a high axial load bearing capacity. Finally, in the prior rotary drill bits, the bearing race of the outer bearing facing the drill bit body is interrupted by the filling hole needed for inserting the rolling elements and insertion of the filler piece. Accordingly, this bearing race has a reduced bearing capacity at the location of the filling hole.

With the above in mind, it is an object of the present invention to provide a rotary drill bit characterized by novel features of construction and arrangement which can effectively withstand extremely high axial forces in addition to radial loads with only a moderate normal elevation in the operating temperature of the roller bearings.

It is a further object of the present invention to provide a rotary drill bit which is of compact and strong construction and is capable of being manufactured economically.

In the rotary drill bit according to the present invention, the roller bearing at the side of the drill bit body which transmits the axial load, is located at the end of the rotary cutter with the largest diameter. Consequently, a large number of rolling elements can be accommodated at the periphery which run in a bearing race uninterrupted, for example, by a filling hole in the trunnion, and in the bore of the rotary cutter. In this way the outer roller bearing provides maximum radial and axial load bearing capacity. By this arrangement, the roller bearing is especially adapted and suitable for taking up the operating pressures of the rotary cutter directed toward the drill bit body. Additionally, by this arrangement, the bearing friction heat developed in the outer roller bearing can be readily dissipated by convection or heat conductivity to the ambient environment or to the adjacent drill bit body.

Further, in accordance with the present invention, the inner roller bearing is incorporated in the rotary cutter in a manner so that the rolling elements run in deep radial race grooves of the trunnion and the rotary cutter and consequently securely hold the rotary cutter in place against accidental removal from the trunnion. The rotary drill bit of the present invention is therefore comprised of few components and the assembly of the rotary cutters to the trunnion of the drill bit body can be accomplished rather economically.

Other features of the invention, include the arrangement of conical rollers of the outer bearing which run on a conical bearing race in the bore of the rotary cutter with their cone angle corresponding to the shape of the outer contour of the conical rotary cutter. Consequently, in this manner the wall of the rotary cutter over the length of the bearing is of uniform thickness and consequently, a compact outer roller bearing which optimally utilizes the space in the rotary cutter is provided. Additionally, a rigid, break-resistant trunnion results since the conical bearing race of the tapered or conical rollers on the trunnion increase in diameter towards the drill bit body.

Note also that the tapered rollers run directly on the trunnion of the drill bit body and directly in the bore of the rotary cutter to minimize construction costs by maintaining the number of structural elements to a minimum.

In accordance with another feature of the present invention, the rotary cutter includes a circumferentially extending guide flange or shoulder formed integrally with the cutter and providing a guide surface against which the tapered rolling elements engage. The fixed shoulder for axially guiding the conical rollers is desirable since it cannot be loosened or detached even with high impact loads occurring in heavy operations.

The rotary drill bit assembly includes an inner roller bearing comprised of cylindrical rollers providing a radial bearing capacity and which is very easy to install and optimally utilizes the limited space available between the rotary cutter and the trunnion.

DESCRIPTION OF THE DRAWING

These and other objects of the present invention and various features and details of the operation and construction thereof are hereinafter more fully set forth with reference to the accompanying drawing, wherein;

The FIGURE is a transverse sectional view through one of the trunnions which mount the conical rotary cutters.

DESCRIPTION OF THE PREFERRED EMBODIMENT

Referring now to the drawing, the drill bit assembly includes a drill bit body generally designated by the numeral 2, a plurality of rotary cutters 1 rotatably supported on trunnions 3 in the present instance formed integrally with the drill bit body. As illustrated, each rotary cutter 1 is supported on the trunnion 3 in an outer tapered or conical roller bearing 4 comprising a plurality of tapered rolling elements 5 facing the drill bit body and in an inner roller bearing 6 comprised in the present instance of a plurality of cylindrical rollers 7.

The roller bearings are oriented relative to one another so that the action force lines 8 of the conical rollers 5 are directed at a radially inward inclination towards the drill bit body 2 and the action force lines 9 of the cylindrical rollers 7 are directed in a truly radially inward direction. Note that the action force lines 8 converge at a point 10 and the action force lines 9 at point 11 on the axis of rotation 12 of the rotary cutter 1 and that the axial distance D between points 10 and 11 on the axis of rotation is relatively long so that the rotary cutter can effectively take up high pitching moments without overloading the rollers of the tapered and cylindrical roller bearings 4 and 6 respectively.

Considering now the specific structural arrangements of the assembly, the tapered rollers 5, of the roller bearing 4 are arranged to run directly on the trunnion 3 of the drill bit body on a tapered or conical bearing race 13 formed directly on the trunnion, the diameter of which increases toward the drill bit body. Consequently, an extremely rigid, break-resistant trunnion is obtained. In the embodiment illustrated, the tapered rollers 5 also run directly on the conical outer bearing race 14 formed by machining in the bore of the rotary cutter 1. The cone angle of the outer bearing race 14 is approximately the same as the cone angle of the outer contour or outer periphery of the conical rotary cutter thereby to provide a relatively thick wall between the bore and the outside surface of the rotary cutter with an essentially constant wall thickness over the length of the outer bearing raceway 14. In this manner the space in the bore of the rotary cutter 1 is optimally utilized for filling with the large diameter tapered rollers 5.

The tapered rollers 5 are guided at their front axial end faces facing the drill bit body 2 by a circumferentially extending shoulder or flange formed in the rotary cutter 15 which as illustrated is formed integrally with the rotary cutter.

A hardened wear plate 16 is inserted in the front surface of the drill bit body 2 facing the rotary cutter 1. The wear plate as illustrated seats in an angular recess 16a. A slip ring 18 fastened with an elastic O-ring 17 in the bore of the rotary cutter 1 slides on the wear plate 16 to produce a seal of the bearing space of the rotary cutter which is very reliable in operation.

The rolling elements are inserted in the annular space between the trunnion and the rotary cutter through a filling port or hole 19 which is circular in cross section and runs parallel to the axis of the trunnion and is formed as a bore hole in the trunnion of the drill bit body 2. The filling hole 19 is arranged to extend radially inside the inner bearing race 13 of the tapered roller bearing 4 and exits at its end facing the rotary cutter into the radially deep bearing race groove 20 of the cylindrical roller bearing 6 machined in the trunnion 3. The filling hole 19 exits into the bearing race groove 20 at a location in the zone of the cylindrical roller bearing 6 which is subjected to relatively small radial stress by the cylindrical roller 7 during operation of the rotary drill bit.

The rolling element filling hole 19 is after assembly of the cylindrical rollers closed with a generally cylindrical elongated filler piece 24 extending through the drill bit body and the length of the trunnion. The portion of the filler piece at the terminal end adjacent the tip of the rotary cutter has an arcuate portion contoured to blend with the race groove 20. The filler piece 24 is formed at its radial inner surface opposite the arcuate raceway section with a slot 26 to receive a locking pin 27 which is fitted in a radial recess in the trunnion 3 to hold the filler piece in place in a predetermined fixed position.

As illustrated, the cylindrical rollers 7 of the bearing 6 run in a deep radial bearing race groove 21 formed integrally in the bore of the rotary cutter 1, for example by machining. The rollers 7 are therefore guided and axially held in place on both sides in the bearing race grooves 20 and 21. In this way, the rotary cutter is secured against accidental removal from the trunnion 3 by the shoulder 22 in the bore of the rotary cutter 1 and by the shoulder 23 at the end of the trunnion 3.

Considering now the assembly of the rotary drill bit, each rotary cutter is first filled with the tapered rollers 5 of the roller bearing 4 and axially pushed with the O-ring 17 and the slip ring 18 on its trunnion 3 until the tapered rollers contact the conical bearing race 13 and trunnion 3. At this point, the slip ring 18 bears against the wear plate 16. Thereafter, the cylindrical rollers 7 are inserted one at a time through the filling hole 19 to a point under the bearing race 13 into the bearing race groove 20 and are uniformly distributed by rotation of the rotary cutter over the circumferance between the bearing race grooves 21 of the rotary cutter 1 and the bearing race groove 20 of the trunnion 3. After all of the cylindrical rollers 7 have been inserted, filler piece 24 is then simply pressed into the filling hole 19 so that the lock pin 27 engages tightly into the slot 26 of the filler piece 24. As an additional safeguard against rotation of the filler piece in the filling hole 19, the inner axial end of the filler piece adjacent the drill bit body is firmly secured by, for example, welding 28.

Even though a particular embodiment of the present invention has been illustrated and described herein, it is of course, to be understood that changes and modifications may be made therein within the scope of the following claims. For example, even though the inner bearing is comprised of cylindrical rollers, other types of rolling elements may be used depending on the direction and magnitude of the load carried by this bearing assembly. Thus, radial rollers, tapered rollers, or balls may be employed. It is, of course, understood that if other types of rolling elements are used, the appropriate deep radial bearing race grooves of the rotary cutter and the trunnion will then have to be adapted to correspond to the contour of the type of rolling elements used.

Also, while the present assembly does not utilize cages in order to accommodate a maximum complement of rolling elements, it is to be understood that the rolling elements of either the inner or outer bearings can be guided by a cage or the like.

Additionally, while the inner bearing consists of a single row of cylindrical rollers, it is of course possible to utilize several inner bearing assemblies and to insert the rolling elements of each of the rows either through a common filling hole or through separate filling holes in the trunnion terminating between the appropriate bearing race grooves in the trunnion.

Furthermore, even though the tapered rollers are illustrated as running directly on raceways formed in the trunnion of the drill bit body or and in the bore of the rotary cutter, bearing races for the tapered rollers can be provided.

What is claimed is:

1. In a rotary drill bit assembly, comprising a drill bit body, at least one trunnion and a rotary cutter rotatably supported on the trunnion by bearing means including at least one inner roller bearing, the rollers of the inner roller bearings running in a deep radial bearing race groove in the trunnion and a deep radial bearing race groove formed in the bore of the rotary cutter and a filling opening extending generally axially in the trunnion between the inner bearing race grooves, characterized in that the outer bearing facing the drill bit body comprises a tapered roller bearing including a plurality of tapered rollers and wherein the filling opening for the rolling elements of the inner bearing is arranged radially inside the inner bearing race of the tapered rollers in the trunnion.

2. In a rotary drill bit as claimed in claim 1 wherein the action force lines of the tapered roller bearings are inclined radially inwardly to the drill bit body.

3. In a rotary drill bit as claimed in claim 1 wherein the tapered rollers run on race way grooves formed directly on the trunnion of the drill bit body.

4. In a rotary drill bit as claimed in claim 1 wherein the tapered rollers run directly on outer race way grooves formed in the interior peripheral surface of the rotary cutter.

5. In a rotary drill bit as claimed in claim 1 wherein the tapered rollers of the tapered roller bearing are axially guided by a shoulder formed with the rotary cutter which confronts the axial in face of the tapered rollers facing the drill bit body.

6. In a rotary drill bit as claimed in claim 1 wherein the inner roller bearing comprises a plurality of cylindrical rollers.

7. In a rotary drill bit body as claimed in claim 1 wherein the cone angle of the outer bearing race is about the same as the cone angle of the outer peripheral surface of the rotary cutter co-extensive with the outer bearing race providing a rotary cutter having a substantially uniform wall thickness between the bore and the outside surface thereof.

8. In a rotary drill bit as claimed in claim 1 wherein the action force lines of the tapered rollers and the action force lines of the cylindrical rollers converge at axially spaced points on the axis of rotation of the rotary cutter and wherein the axial distance of said points is relatively long so that the rotary cutter can withstand high pitching moments without overloading the rolling elements of the bearing assemblies.

* * * * *